Patented Aug. 28, 1934

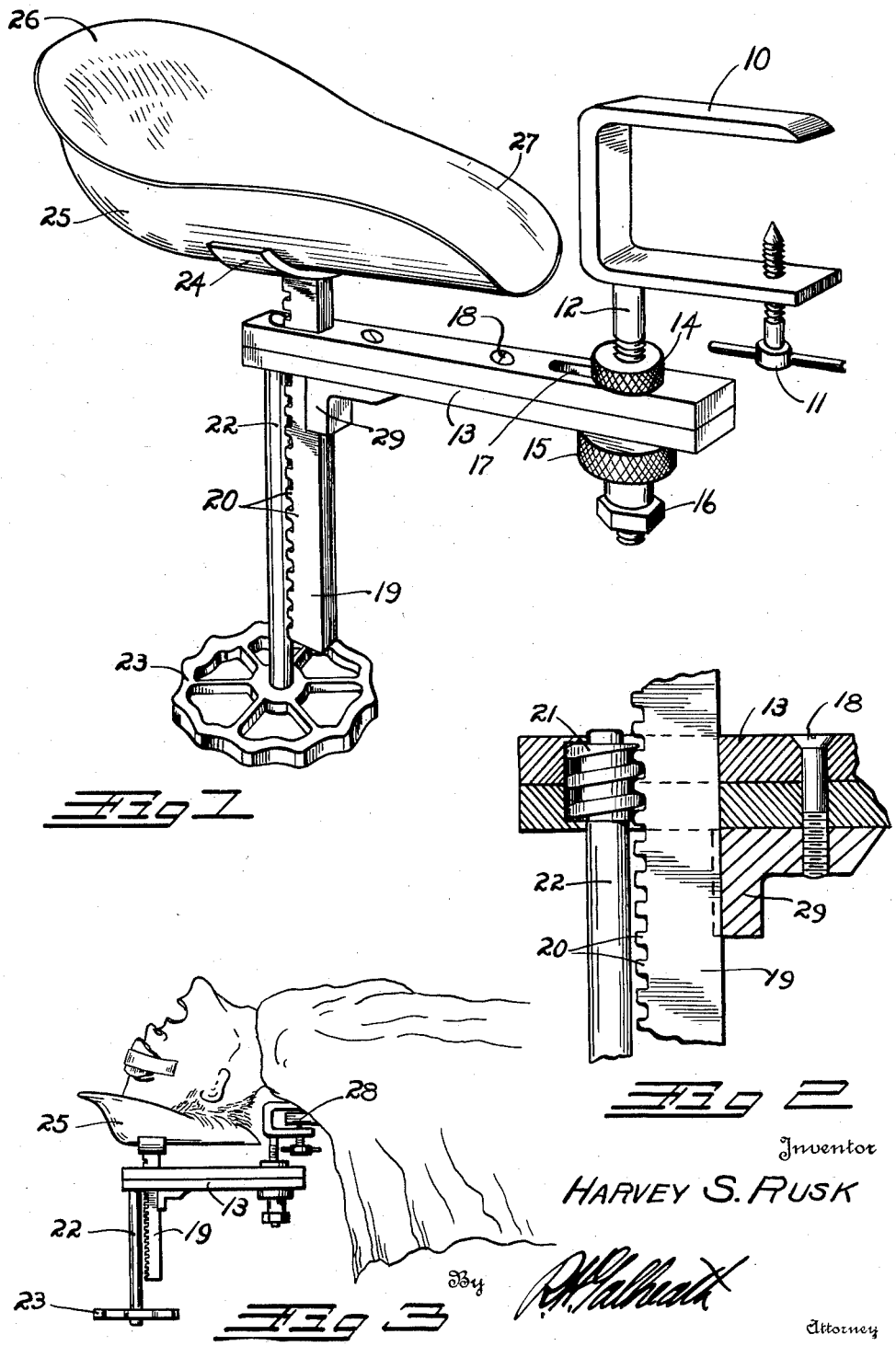

1,971,624

UNITED STATES PATENT OFFICE 1,971,624

SURGICAL HEADREST

Harvey S. Rusk, Pueblo, Colo.

Application December 12, 1933, Serial No. 701,989

7 Claims. (Cl. 45—50)

This invention relates to a surgical headrest for use in connection with any suitable operating table. It is principally intended for supporting the head of a patient during such operations as tonsillectomy, upper jaw and sinus operations, tooth extractions, bronchoscopy, esophagoscopy, etc.

The principal object of the invention is to provide a headrest which can be employed with any suitable table and which can be easily and quickly adjusted for any of the above operations.

Another object of the invention is to so construct the device that it will be small, compact, and easily portable and readily attachable to any desired table or other supporting surface.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating the complete invention.

Fig. 2 is an enlarged longitudinal section illustrating the rack and worm employed in the invention.

Fig. 3 illustrates the appearance of the device in use for an operation such as tonsillectomy.

The invention comprises a table clamp 10 provided with a clamp screw 11 by means of which it may be clamped upon the projecting edge of any desired table. A threaded standard 12 projects downwardly from the outer extremity of the clamp 10.

An arm 13 is supported on the standard 12 between an upper clamp nut 14 and a lower clamp nut 15. The clamp nuts 14 and 15 are preferably knurled to provide an efficient finger grip, as illustrated, and may be permanently locked in any desired set position by means of a lock nut 16. The arm 13 contains an elongated slotted opening 17 for the reception of the standard 12. The slot 17 allows the arm 13 to be longitudinally adjusted with reference to the standard 12.

The arm 13 is preferably formed of two similar parts attached together by means of screws 18 or other fastening devices. A rack post 19 extends vertically through the outer extremity of the arm 13 and is provided on its forward edge with suitable rack teeth 20. The rack teeth 20 are engaged by a worm 21 formed on the upper extremity of a worm shaft 22. The lower extremity of the worm shaft 22 is provided with a hand wheel 23.

It is desired to call particular attention to the simple and efficient manner in which the worm 21 it held in place. This is accomplished by a counterbore in both parts of the arm 13. The two counterbores are then placed together about the worm to form a socket therefor and to prevent endwise movement thereof.

The upper extremity of the rack post 19 terminates in a yoke 24 in which a suitable head pan 25 is secured. The head pan 25 is scoop-shaped in contour having a relatively high closed outer extremity 26 and an open channel-shaped inner extremity 27.

In use, the clamp member 10 is secured on the extremity of an operating table 28 by means of the clamp screw 11. The nuts 14 and 15 are adjusted to bring the arm to the lowest required position and to bring the head pan 25 to the proper spaced position with relation to the table 28. The patient's head is now positioned in the pan 25, as shown in Fig. 3, and, by rotation of the hand wheel 23 the head is raised or lowered to the desired operating position.

For certain operations such as tonsillectomy, sinus operations, tooth extractions, etc., it is preferred to hold the head lower than the larynx to prevent pus and blood from entering the latter. This can be readily accomplished by lowering the headpan 25 to the desired level. For certain other operations such as esophagoscopy, bronchoscopy, etc., it is desired to have the head in a hyper-extended backward position. This can be readily accomplished by loosening the nut 15 and pushing the head pan 25 toward the table. This will cause the high end of the pan 26 to engage the head and bend it backwardly at the neck so as to bring the esophagus to the proper aligned position.

For operations requiring a relatively high head the hand wheel 23 may be rotated to raise the pan to the desired height. The vertical adjustment is gradual and smooth, and can be accomplished with micrometer exactness. The worm and rack construction is irreversible so that there is no danger of the head dropping from the adjusted position during the operation.

The outward pressure of the head on the closed extremity 26 of the head pan tends to tilt the rack bar 19 outwardly. This tilting is prevented by means of an angle clip 29 which contacts the inner edge of the rack bar to prevent tilting thereof.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A surgical headrest comprising: a supporting member; a threaded standard extending downwardly from said supporting member; an arm extending outwardly from said standard; a vertical post supported adjacent the exterior extremity of said arm; a head receiving member carried on the upper extremity of said post; means for vertically moving said post, said latter means comprising: rack teeth formed in said post; a worm engaging said teeth; and means for rotating said worm.

2. A surgical headrest comprising: a supporting member; a threaded standard extending downwardly from said supporting member; an arm extending outwardly from said standard; a vertical post supported adjacent the exterior extremity of said arm; a head receiving member carried on the upper extremity of said post; means for vertically moving said post; and means for preventing tilting of said post comprising: an angle member extending downwardly from said arm and engaging the rear edge of said post.

3. A surgical headrest comprising: a table clamp member; a standard extending downwardly from said clamp member; an arm extending outwardly from said standard, said arm being provided with a longitudinal slotted opening for receiving said standard so as to allow longitudinal adjustment of said arm; and means for supporting a head adjacent the outer extremity of said arm.

4. A surgical headrest comprising: a table clamp member; a standard extending downwardly from said clamp member; an arm extending outwardly from said standard, said arm being provided with a longitudinal slotted opening for receiving said standard so as to allow longitudinal adjustment of said arm; means for supporting a head adjacent the outer extremity of said arm, said standard being threaded; and clamp nuts threaded thereon so as to engage the top and bottom surfaces of said arm to clamp it in any desired angular, vertical, or longitudinal position.

5. In a surgical headrest: a supporting arm, said arm being formed of two parts secured together; a worm clamped between said two parts; a rack bar passing through said parts and provided with teeth engaging said worm; a head pan supported by said rack bar; and means for rotating said worm.

6. In a surgical headrest: a supporting arm, said arm being formed of two parts secured together; a worm clamped between said two parts; a rack bar passing through said parts and provided with teeth engaging said worm; a head pan supported by said rack bar; means for rotating said worm, said means comprising: a worm shaft extending parallel to said rack bar; and a hand wheel on said shaft beyond the extremity of said rack bar.

7. A surgical headrest comprising: a U-shaped, horizontally-positioned, clamp member; a clamp screw extending through the lower arm of said clamp member adjacent the open extremity thereof; a threaded standard extending downwardly from the closed extremity of said clamp member; a horizontal arm, said arm being provided with a longitudinal slot for receiving said standard; clamp nuts on said standard for clamping said arm in place thereon; a vertical rack bar passing through the outer extremity of said arm; a head supporting pan supported on the upper extremity of said rack bar; and means for manually raising and lowering said rack bar.

HARVEY S. RUSK.